(12) United States Patent
Becka

(10) Patent No.: US 7,392,685 B2
(45) Date of Patent: Jul. 1, 2008

(54) ACCELEROMETER HAVING ADJUSTABLE DAMPING

(75) Inventor: Stephen F. Becka, North Bend, WA (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 11/190,371

(22) Filed: Jul. 26, 2005

(65) Prior Publication Data
US 2007/0022811 A1    Feb. 1, 2007

(51) Int. Cl.
*G01P 21/00* (2006.01)
*G01P 15/00* (2006.01)

(52) U.S. Cl. .................................. 73/1.38; 73/514.01

(58) Field of Classification Search ............. 73/514.01, 73/491, 503.3, 504.03, 652, 866.2, 514.07, 73/514.09, 514.14, 514.32, 504.02, 1.38, 73/504.2
See application file for complete search history.

(56) References Cited

U.S. PATENT DOCUMENTS

| 4,945,765 | A |  | 8/1990 | Roszhart |
| 5,006,487 | A |  | 4/1991 | Stokes |
| 5,659,195 | A |  | 8/1997 | Kaiser et al. |
| 5,691,471 | A | * | 11/1997 | Okazaki et al. ........... 73/504.04 |
| 5,698,783 | A | * | 12/1997 | Murakoshi et al. ....... 73/504.03 |
| 5,905,203 | A |  | 5/1999 | Flach et al. |
| 6,230,567 | B1 |  | 5/2001 | Greiff |
| 6,631,641 | B1 |  | 10/2003 | Schalk et al. |
| 6,705,166 | B2 |  | 3/2004 | Leonardson |
| 6,841,992 | B2 |  | 1/2005 | Yue et al. |

FOREIGN PATENT DOCUMENTS

DE    195 41 388 A1    5/1997

* cited by examiner

*Primary Examiner*—Hezron E. Williams
*Assistant Examiner*—Gunnar J Gissel
(74) *Attorney, Agent, or Firm*—Black Lowe & Graham PLLC

(57) ABSTRACT

An apparatus and method for an accelerometer mechanism having a proof mass that is suspended for out-of-plane motion between first and second damping plates, wherein at least one of the first and second damping plates is movable between first and second positions relative to the proof mass under the control of a position control structure that is coupled to the movable damping plate for positioning the damping plate in the second position relative to the proof mass.

22 Claims, 4 Drawing Sheets

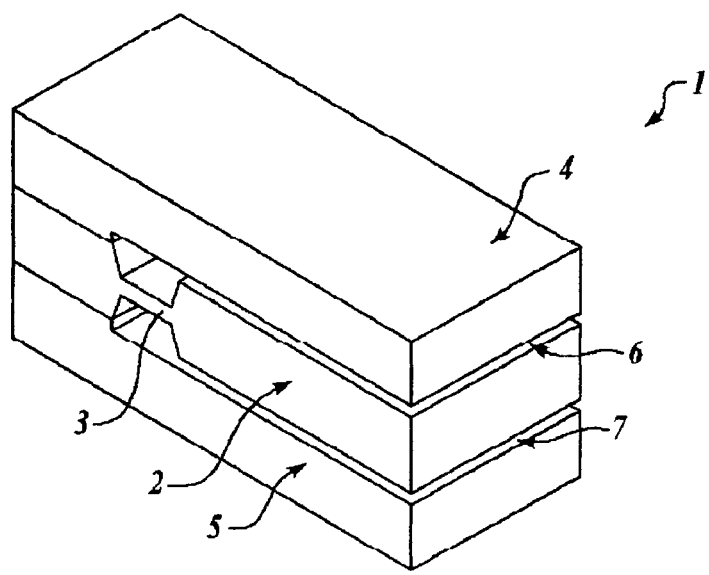
FIG. 1 *(PRIOR ART)*
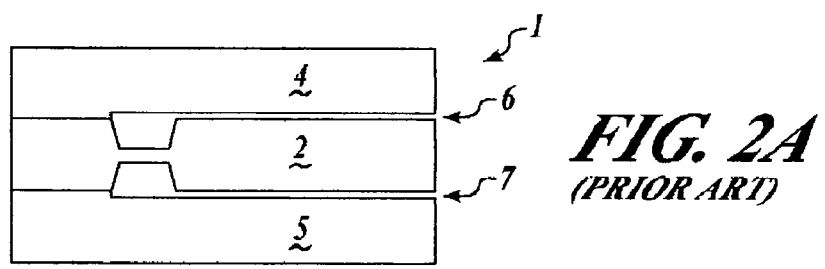
FIG. 2A *(PRIOR ART)*
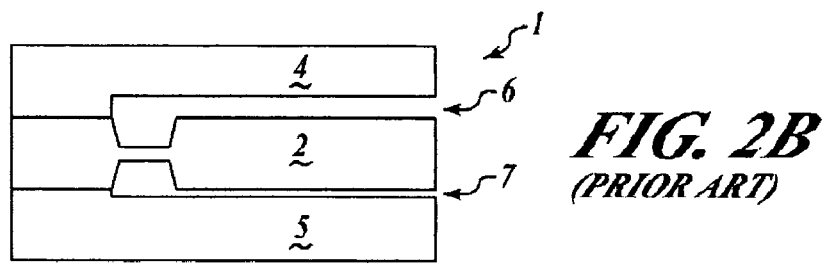
FIG. 2B *(PRIOR ART)*
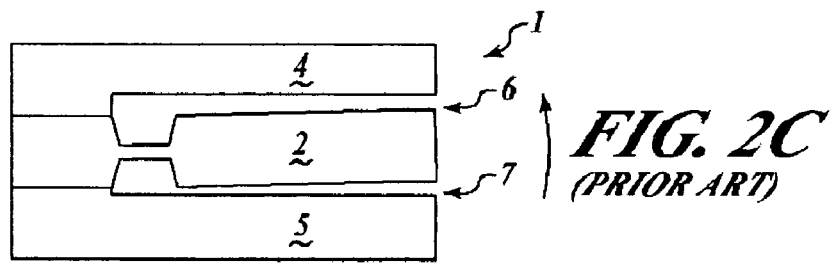
FIG. 2C *(PRIOR ART)*

ACCELEROMETER HAVING ADJUSTABLE DAMPING

The invention described herein was made in the performance of work under Air Force Research Laboratories (AFRL) Contract No. F29601-03-C-0124. The Government may have rights to portions of this invention.

FIELD OF THE INVENTION

The present invention relates to acceleration and other force sensor devices and methods, and in particular to accelerometers and other force sensing devices having a proof mass suspended for out-of-plane motion and damping of the proof mass provided by damping plates (also known as "cover plates") above and beneath the proof mass in such a way that the damping plates define thin gaps above and below the proof mass.

BACKGROUND OF THE INVENTION

Pendulous accelerometer and other force sensing devices are generally well-know. In particular, pendulous accelerometers are generally well-know as being macro-machined of quartz or another suitable material and having a tuning fork type sensor connected between the proof mass and the frame.

FIG. 1 illustrates a typical generic state of the art pendulous accelerometer or other force sensing device mechanism 1 having a proof mass 2 suspended for out-of-plane motion in response to acceleration. The proof mass 2 is suspended by a flexure 3 between a pair of damping or "cover" plates 4, 5. The generic accelerometer 1 may use gas spring damping, also known as "squeeze film damping," to smooth out-of-plane motion of the proof mass 2 during exposure to a transitory input, such as a vibratory input.

Damping of the proof mass 2 is provided by the damping plates 4, 5 on either side of the proof mass 2 that are spaced closely enough to form thin gaps 6, 7 between the proof mass and the two damping plates 4, 5. The gaps 6, 7 are filled with a gas that is present in the ambient environment surrounding the accelerometer mechanism 1. Damping of the proof mass 2 is due to compression of the gas and Bernoulli effects within the gaps 6, 7. Damping due to gas compression occurs when the proof mass 2 moves out-of-plane, which causes closing of one gap 6 (or 7) and simultaneous opening of the gaps 7 (or 6). Vibratory input to the accelerometer causes rapid alternate closing and opening of the gaps 6, 7. The damping gaps 6, 7 have no effect when the proof mass 2 is stationary, or moves in response to a steady acceleration input.

In general, the effective damping due to the gas compressibility in each gap is roughly a function of the square of the damper area the cube of the damper gap.

FIG. 2A illustrates an ideal gas spring damper configuration wherein identical gap geometry exists on both surfaces of the proof mass 2, i.e., the heights of the two gaps 6 and 7 are identical, which result in balanced damping forces against both surfaces of the proof mass 2.

However, in a practical accelerometer mechanism 1, inequality in the height of the two gaps 6, 7 can occur, as illustrated in FIG. 2B. The unequal gap spacing affects the behavior of the gas spring damper in an accelerometer where gas compression is the dominating factor.

When the gaps 6, 7 are unequal, more gas compression force is exerted by the narrow gap, and under the application of vibration the proof mass 2 moves to equalize the compression forces in the gaps 6, 7, as illustrated by the arrow in FIG. 2C. The resultant out-of-plane offset of the proof mass 2 is erroneously detected as an acceleration input, which imparts an offset or bias to the output of the accelerometer mechanism 1.

As stated above, the damping force is proportional to the cube of the damping gap dimension h of the gaps 6, 7. This cubic proportionality causes achievement of balanced damping forces to be very difficult in practice due to manufacturing tolerances.

Therefore, devices and methods for overcoming these and other limitations of typical state of the art MEMS accelerometer and other devices are desirable.

SUMMARY OF THE INVENTION

The present invention is an apparatus and method for overcoming limitations of the prior art by providing a means for adjusting one or both of the gas damping gaps formed between the proof mass and the first and second damping or "cover" plates and thereby equalizing the gas damping forces on the pendulum.

According to one aspect of the invention, the method and apparatus of the present invention provide an accelerometer mechanism having a proof mass that is suspended between first and second damping plates for out-of-plane motion in response to an acceleration input. One or both of the first and second damping plates is structured with a flexure or hinge for being moved or bent between a first positions relative to the proof mass and a range of second relative positions for equalizing the first and second gas damping gaps. Control structure is coupled to the movable damping plate for driving the movable damping plate into the second position relative to the proof mass and subsequently retaining the resulting altered relationship between the movable damping plate and the proof mass.

According to one aspect of the invention, the control structure is adjustable, either by application of an electrical current or a mechanical stress, for adjusting the relationship between the movable damping plate and the proof mass.

According to another aspect of the invention, the control structure is adjustable remotely, whereby one or both of the gas damping gaps is dynamically adjustable under exposure to a vibration input.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view that illustrates a typical generic state of the art accelerometer mechanism having a proof mass that is suspended for out-of-plane motion, FIG. 2A illustrates an accelerometer mechanism having an ideal gas spring damper configuration;

FIG. 2B illustrates a practical accelerometer mechanism having an inequality in the height of the two gas spring damper gaps, FIG. 2C illustrates movement of the proof mass of a practical accelerometer mechanism in response to having an inequality in the height of the two gas spring damper gaps;

FIGS. 3A and 3B illustrate the movable damping plate of the present invention embodied in a novel accelerometer mechanism, wherein FIG. 3A is a perspective view of the novel accelerometer mechanism of the invention, and FIG. 3B is an elevation view thereof;

FIGS. 5A, 5B and 5C illustrate different alternative embodiments of a retaining structure of the invention for retaining the movable damping plate of the present invention in an altered position relative to the proof mass wherein the first and second gas damping gaps are substantially equalized, wherein FIG. 5A is a perspective view of the novel accelerometer mechanism of the invention, and FIGS. 5B and 5C are elevation views thereof;

DETAILED DESCRIPTION OF PREFERRED EMBODIMENT

In the Figures, like numerals indicate like elements.

The Figures illustrate the method and apparatus of the present invention for an accelerometer mechanism having a proof mass suspended between first and second damping or "cover" plates for out-of-plane motion in response to an acceleration input with first and second gas damping gaps being formed between the proof mass and the respective first and second damping plates. One or both of the first and second damping plates is structured with a flexure or hinge for being moved or bent between first and second positions relative to the proof mass for equalizing the first and second gas damping gaps. Retaining structure is coupled to the movable damping plate for retaining the damping plate in the second position relative to the proof mass.

Figure 3A:
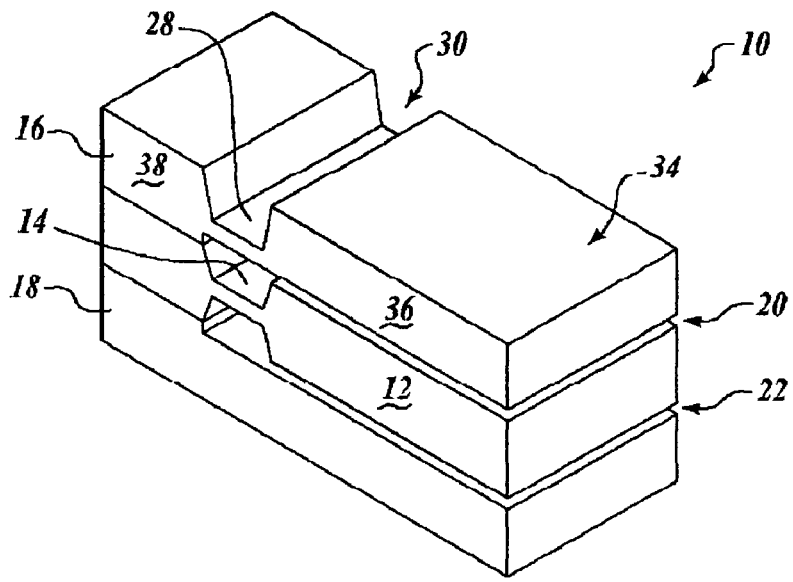
Figure 3B:
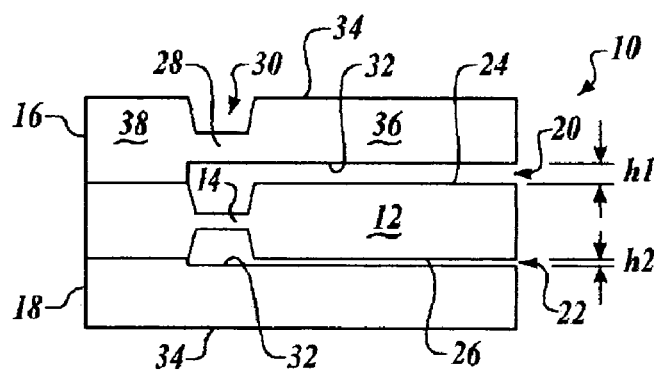

FIGS. 3A and 3B illustrate the movable damping plate of the present invention embodied in a novel accelerometer mechanism 10 having a proof mass 12 suspended for out-of-plane motion in response to acceleration. The proof mass 12 is suspended by a flexure 14 between a pair of damping or "cover" plates 16, 18 that are spaced different first and second distances h1 and h2 from the proof mass 12 when it is in a null or 0 g position. The first and second distances h1 and h2 is shown as an exaggerated amount to more clearly illustrate the invention.

The novel accelerometer mechanism 10 uses gas spring damping or squeeze film damping to smooth out-of-plane motion of the proof mass 12 during exposure to a transitory input, such as a vibratory input. Damping of the proof mass 12 is provided by the damping plates 16, 18 on either side of the proof mass 12 that are spaced closely enough to form respective thin damping gaps 20, 22. The damping gaps 20, 22 are filled with a gas that is present in the ambient environment surrounding the accelerometer mechanism 10. An inequality between the first and second distances h1 and h2 may be enough to result in a difference in the damping gaps 20, 22 and the resultant gas compression force that is exerted against opposite surfaces 24, 26 of the proof mass 12. Under the application of vibration the proof mass 12 may move to equalize the compression forces in the damping gaps 20, 22, which biases the output of the accelerometer mechanism 10, as discussed herein and illustrated by the prior art in FIG. 2C.

One and optionally both of the damping plates 16 (shown) and 18 are structured to be flexible. Accordingly, each flexible damping plate 16 is bendable into an appropriate shape that substantially equalizes or nulls imbalances in damping force between the two damping gaps 20, 22.

According to one embodiment of the invention, one and optionally both of the damping plates 16 and 18 are formed with a flexure 28 that is thin enough to permit bending of the damping plates 16, 18 having the flexure 28. The flexure 28 is formed by cutting or otherwise forming a groove 30 or series of such grooves into one or both of the proximate and distal surfaces 32, 34 (shown) of one or both damping plates 16 and 18. The form of the flexure 28 is nonspecific. For example, the flexure 28 is optionally of right circular cross section or a ribbon form as shown. The flexure 28 is formed by any convenient means, including cutting using a dicing saw, ultrasonic machining, chemical etching, EDM (Electrical Discharge Machining), or other conventional machining methods appropriate to the material of the damping plates 16, 18.

Figure 4:
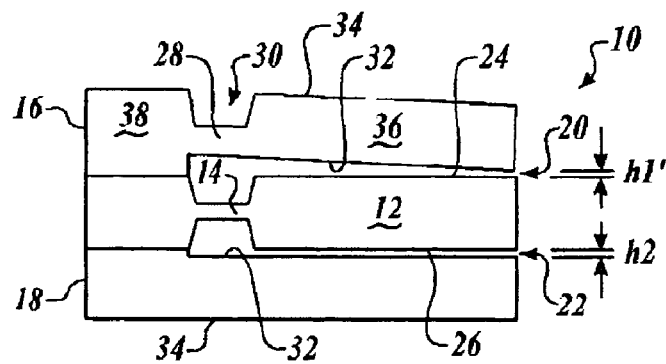
FIG. 4 is an elevation view that illustrates the novel accelerometer mechanism of the present invention having the movable damping plate relocated relative to the proof mass for equalizing first and second gas damping gaps.

FIG. 4 illustrates one of the damping plates 16 (shown) and 18 moved toward the proof mass 12 for equalizing the first and second gas damping gaps 20, 22. The damping plate 16 is shown bent an exaggerated amount to more clearly illustrate the invention. The flexures 28 result in a flexibility of one or both damping plates 16, 18 that allows a movable portion 36 spaced opposite the proof mass 12 to pivot about the flexure 28 and move away from or toward (shown) the proof mass 12, while a remainder portion 38 of the respective damping plate 16, 18 remains stationary relative to the proof mass 12.

Movement of the movable portion 36 of the respective damping plate 16 to a new position places the proximate surface 32 at a new altered distance h1' from the proof mass 12 that is substantially identical to the distance h2 on the opposite side of the proof mass 12. Thus, the flexible structure of the damping plates 16, 18 provided by the flexure 28 permits alteration of one or both of the respective damping gaps 20, 22, whereby the damping gaps 20, 22 are substantially equalized. Equalizing the damping gaps 20, 22 equalizes the gas compression forces exerted against opposite surfaces 24, 26 of the proof mass 12 and eliminates the resultant bias in the output of the accelerometer mechanism 10.

Many different structures are contemplated for fixing the movable portions 36 of one or both the damping plates 16, 18 and can be substituted without deviating from the scope and intent of the claimed invention.

Figure 5A:
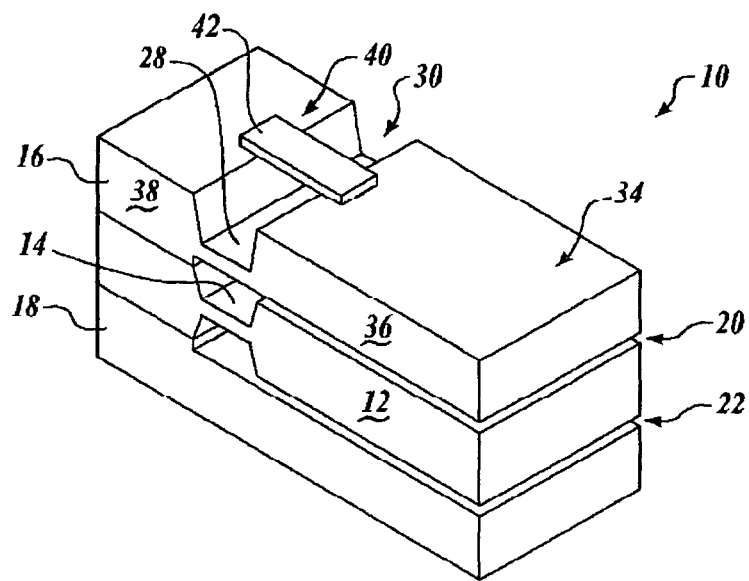

FIG. 5A illustrates one exemplary position control structure 40 for driving the movable portion 36 of one of the movable damping plates 16, 18 of the present invention to place the proximate surface 32 at the new altered distance h1' from the proof mass 12. The position control structure 40 also retains the movable portion 36 with the proximate surface 32 at the new altered distance h1' from the proof mass 12. By example and without limitation, the position control structure 40 is embodied as a portion 42 of a substantially rigid material such as silicon that is bonded or otherwise fixedly coupled between the movable and stationary portions 36, 38 of the damping plate 16 (or 18) on an opposite side of the groove 30 from the flexure 28. According to one embodiment of the invention, the rigid portion 42 is embodied as a portion of a piezoelectric material such as quartz that is bonded or otherwise the resultant damping gap 20 (or 22). Such remote adjustment of the altered h1' permits dynamic adjustment of the damping gap 20 (or 22) during exposure to a vibration environment, whereby the gas damping is electrically tunable within a range.

Figure 5B:
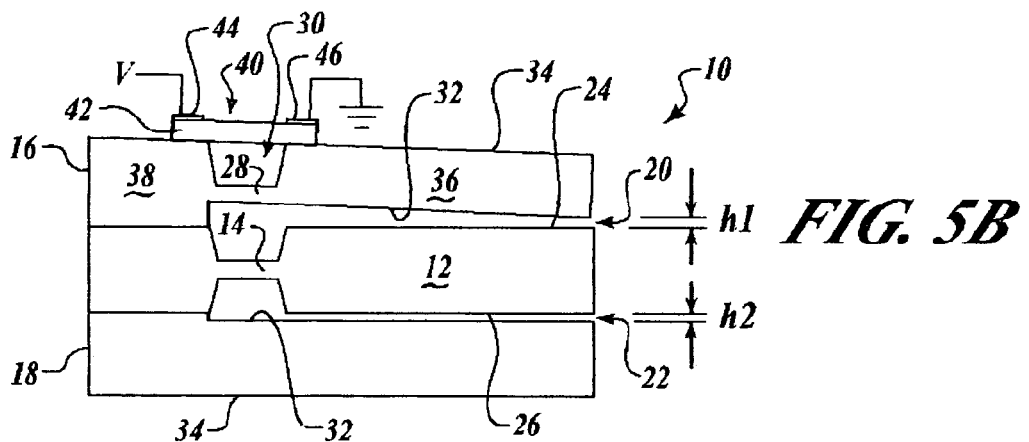
Figure 5C:
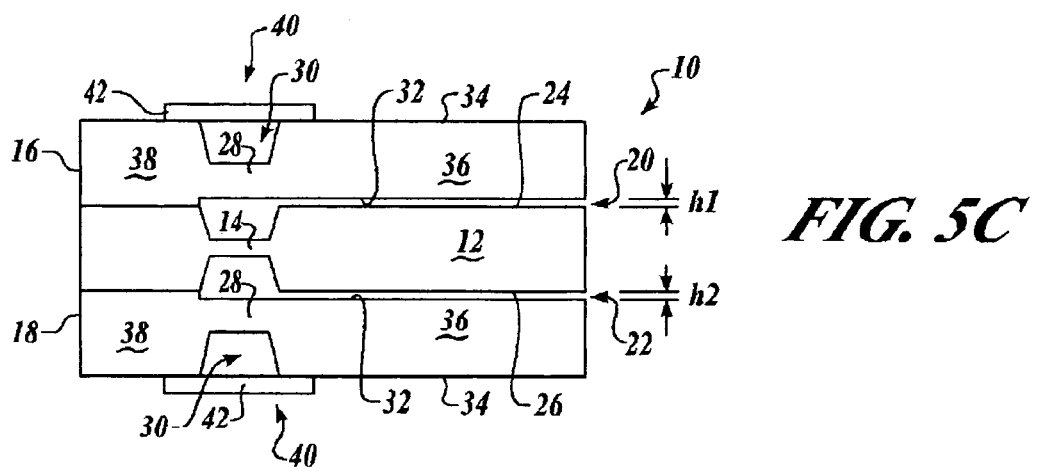

FIG. 5C illustrates another embodiment of the accelerometer mechanism 10 wherein the first and second damping plates 16, 18 are both embodied as movable damping plates each having the movable portion 36 suspended from the stationary portion 38 by the flexure 28. Both the first and second damping plates 16, 18 include the position control structure 40 for driving the respective movable portion 36 of one of the movable damping plates 16, 18 to respective new altered distances h1' and h2' and subsequently fixing the movable portions 36 in their respective new relationships with the proof mass 12.

As illustrated here, the different damping gap distances or heights h1 and h2 are both adjustable within a range to alter the resultant damping gaps 20, 22 between the proof mass 12 and respective first and second damping plates 16, 18. The resultant new altered distances h1' and h2' are substantially equal, which results in damping gaps 20, 22 being substantially equalized. The new altered distances h1' and h2' are substantially fixed relative to the respective opposite surfaces 24, 26 of the proof mass 12 by the substantially rigid portion 42 fixedly coupled between the movable and stationary portions 36, 38 of the damping plate 16 (or 18) on an opposite side of the groove 30 from the flexure 28.

FIG. 5B illustrates another exemplary position control structure 40 for driving the movable portion 36 of one of the movable damping plates 16, 18 to the new altered distance h1' and fixing it in position. The rigid portion 42 is embodied by the piece of piezoelectric material which is further structured to be adjustable within a range of lengths by application of an electrical signal, whereby the resulting altered distance h1' of the proximate surface 32 from the proof mass 12 is adjustable within a range. For example, the piece of piezoelectric material 42 is optionally metalized with electrical contacts 44, 46 that permit application of an electrical voltage signal V, which causes it to extend or contract a small as a function of the applied voltage V. This piece of piezoelectric material 42 thus provides a method for rigidly fixing the altered height h1' of the respective gap 20 (or 22) which is yet adjustable by alteration of the applied voltage V.

Furthermore, the electrical voltage signal V is optionally applied remotely from the accelerometer mechanism 10 which permits remote adjustment of the altered height h1' and coupled between the stationary and movable portions 36, 38 of the respective movable damping plates 16, 18.

Optionally, the substantially rigid portions 42 are embodied as piezoelectric material which is metalized with the electrical contacts 44, 46 for application of the voltage signal V for fixedly adjusting the altered heights h1' and h2' of the respective gaps 20, 22. Remote adjustment of the altered heights h1' and h2' permits dynamic adjustment of the respective damping gaps 20 and 22 during exposure to a vibration environment, whereby the gas damping is electrically tunable within a range.

Alternatively, the substantially rigid portion 42 is formed of a material having a thermal coefficient of expansion different from the material of the damping plates 16, 18, either much higher or much lower. The substantially rigid portion 42 is coupled between the stationary and movable portions 36, 38 of the respective movable damping plates 16, 18 at an elevated temperature. The elevated temperature is selected to cooperate with the thermal expansion coefficient of both the rigid portion 42 and the damping plates 16, 18 such that, when the accelerometer mechanism 10 is at an operating temperature below the elevated coupling temperature, a resultant change in relative dimension between the rigid portion 42 and the damping plates 16, 18 caused by the difference in thermal expansion induces a differential strain between the two bodies. The differential strain between the rigid portion 42 and the respective damping plate 16, 18 induces a stress into the damping plate 16, 18 that causes the flexure 28 to bend, which changes the damping gap heights h1 and h2 to the new substantially equal altered distances h1' and h2'.

Figure 6:
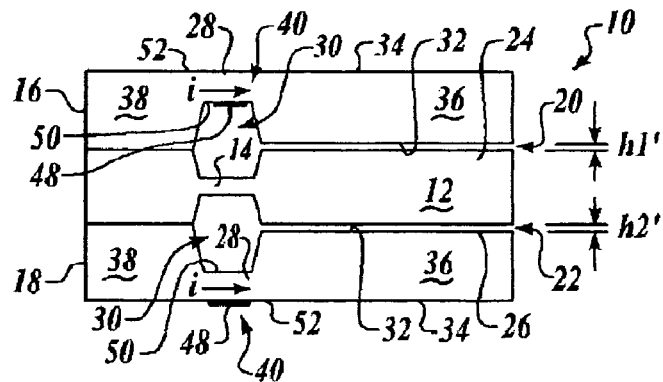
FIG. 6 is an elevation view that illustrates another alternative embodiment of retaining structure of the invention for retaining the movable damping plate of the present invention in an altered position relative to the proof mass.

FIG. 6 illustrates another embodiment of the accelerometer mechanism 10 wherein the first and second damping plates 16, 18 are both embodied as movable damping plates each having the movable portion 36 suspended from the stationary portion 38 by the flexure 28. As illustrated here, the flexures 28 are formed by forming the groove 30 or series of such grooves on the inner surface 32 of the first and second damping plates 16, 18 proximate to the proof mass 12.

Also illustrated is another exemplary position control structure 40 for driving the movable portion 36 of one of the movable damping plates 16, 18 relative to the proof mass 12 and fixing the altered relationship. By example and without limitation, the position control structure 40 is embodied as a relatively thick portion 48 of high resistivity material plated or otherwise deposited onto proximal or distal surfaces 50, 52 of the flexure 28 (shown above and below, respectively). According to one embodiment of the invention, the thick portion 48 of high resistivity material possesses a thermal coefficient of expansion different from the material of the damping plates 16, 18. An electrical current signal i is passed through the thick portion 48 of high resistivity material which responsively heats up. The resultant change in relative dimension between the portion 48 of high resistivity material and the material of the respective damping plate 16, 18 caused by the difference in thermal expansion induced by the heat in the high resistivity portion 48 results in a differential strain between the two bodies. The differential strain between the high resistivity portion 48 and the respective damping plate 16, 18 induces a stress into the damping plate 16, 18 that causes the flexure 28 to bend within a range.

The different damping gap distances or heights h1 and h2 are both adjustable to the new altered distances h1' and h2' by application of the electrical current signal i to the high resistivity portion 48. The resultant new altered distances h1' and h2' are substantially equal, which results in damping gaps 20, 22 being substantially equalized. Consistent heating of the high resistivity portion 48, for example by continuous application of the current i, causes the new altered distances h1' and h2' to be substantially fixed relative to the respective opposite surfaces 24, 26 of the proof mass 12.

Changes in the temperature of the high resistivity portion 48 changes the differential strain between the high resistivity portion 48 and the respective damping plate 16, 18, which in turn changes the a stress induced into the damping plate 16, 18. Accordingly, the flexure 28 bends a different amount that is a function of the electrical current i applied. Thus, the high resistivity portion 48 provides a method for rigidly fixing the new substantially equal altered damping gap heights h1' and h2' of the respective gaps 20, 22, which is yet adjustable within a range by alteration of the current signal i applied.

Furthermore, the electrical current i is optionally applied remotely from the accelerometer mechanism 10, which permits remote adjustment of the altered heights h1' and h2' and the respective resultant damping gaps 20 and 22. Such remote adjustment of the altered heights h1' and h2' permits dynamic adjustment of the resultant damping gaps 20 and 22 during exposure to a vibration environment, whereby the gas damping is electrically tunable within a range.

Figure 7A:
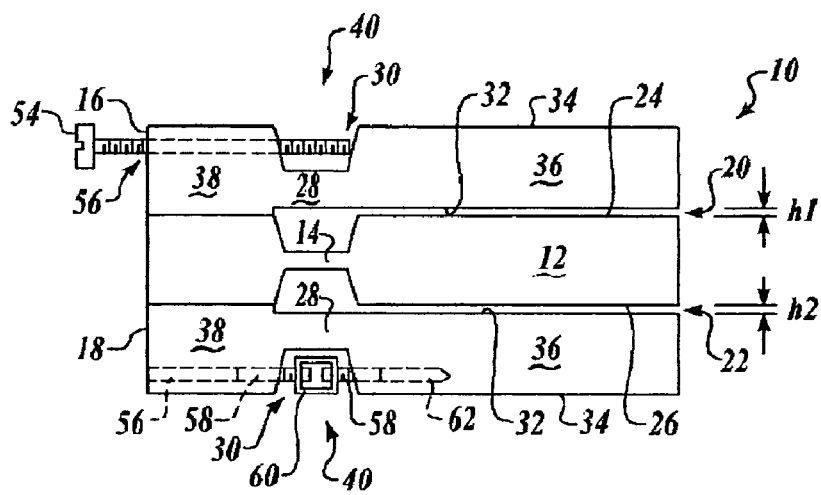
FIGS. 7A and 7B are elevation views that illustrate yet other alternative embodiments of retaining structure of the invention for retaining the movable damping plate of the present invention in altered positions relative to the proof mass.

FIG. 7A illustrates yet another exemplary embodiment of the position control structure 40 for driving the movable portion 36 of one of the movable damping plates 16, 18 relative to the proof mass 12 and fixing the new altered relationship. By example and without limitation, the position control structure 40 is embodied as a screw 54 or other threaded device between the movable and stationary portions 36, 38 for pushing them apart when the screw 54 is advanced through a threaded hole 56 through the stationary portion 38 and across the groove 30. As illustrated in the first damping plate 16, spreading the movable and stationary portions 36, 38 rotates the movable portion 36 toward (shown) or away from the proof mass 12 depending upon whether the flexure 28 is proximal to the proof mass 12, as shown, or distal therefrom. According to one embodiment of the invention, the flexure 28 is sufficiently stiff to return the movable portion 36 to its original arrangement relative to the stationary portion 38, which rotates the movable portion 36 back away from (shown) or toward the proof mass 12 when the screw 54 is withdrawn and retreats from the movable portion 36.

The screw 54 in threaded hole 56 thus provides another method for rigidly fixing the altered damping gap heights h1' and h2' of the respective gaps 20, 22, which is yet adjustable within a range by using the screw 54 to alter the width of the groove 30 by varying the pressure applied to the movable portion 36.

Furthermore, the screw 54 is mechanically advanced or retracted outside of the accelerometer mechanism 10, which permits dynamic adjustment of the altered heights h1' and h2' and the respective resultant damping gaps 20 and 22 during exposure to a vibration environment, whereby the gas damping is tunable.

According to one variation of this exemplary embodiment of the position control structure 40 illustrated in the second damping plate 18, wherein a pair of threaded rods 58 are used with a turnbuckle 60. The two threaded rods 56, 58 are turned into both the threaded hole 56 through the stationary portion 38 and a second oppositely threaded hole 62 in the movable portion 36. The threaded rods 56, 58 thus span across the groove 30 between threaded holes 54, 62 in both the stationary portion 38 and the movable portion 36. Thus, the turnbuckle 60 either advances the threaded rods 56, 58 for spreading the groove 30, or retracts the threaded rods 56, 58 for contracting the groove 30. The movable portion 36 is thus moved toward or away from the proof mass 12, and rigidly fixes the new substantially equal altered damping gap heights h1' and h2' of the respective gaps 20, 22. The threaded rods 56, 58 and turnbuckle 60 thus provide another method for rigidly fixing the altered damping gap heights h1' and h2' of the respective gaps 20, 22, which is yet adjustable by using the turnbuckle 60 to alter the combined length of the two threaded rods 56, 58.

Furthermore, the threaded rods 56, 58 and turnbuckle 60 are mechanically adjustable outside of the accelerometer mechanism 10, which permits dynamic adjustment of the altered heights h1' and h2' and the respective resultant damping gaps 20 and 22 during exposure to a vibration environment, whereby the gas damping is tunable.

Figure 7B:
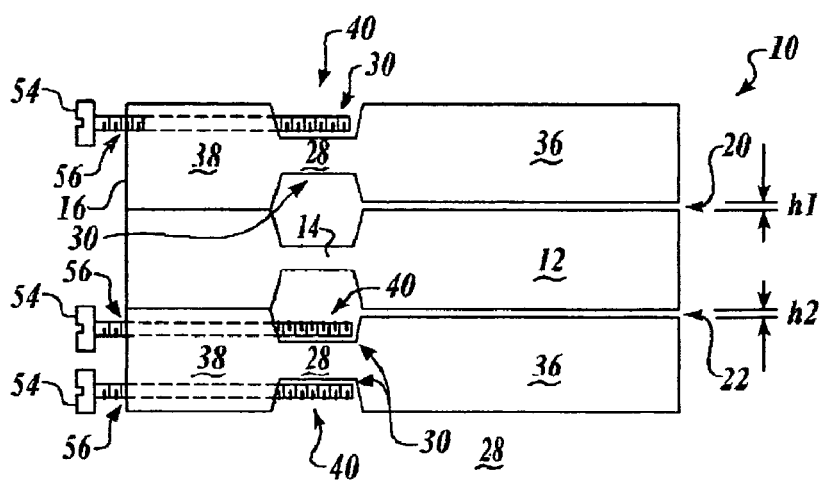

FIG. 7B illustrates yet another embodiment of the accelerometer mechanism 10 wherein the first and second damping plates 16, 18 are both embodied as movable damping plates each having the movable portion 36 suspended from the stationary portion 38 by the flexure 28. As illustrated here, the flexures 28 are formed substantially midline of the damping plates 16, 18 by forming a pair of the grooves 30 or series of such pairs of grooves on both the inner surface 32 of the damping plates 16, 18 proximate to the proof mass 12 and also on the outer surface 34 distal from the proof mass 12. The movable portion 36 is thus rotatable about the midline of the respective damping plate 16, 18, for example by advancing or retracting the screw 54 across one of the grooves 30, as illustrated in the first damping plate 16.

As illustrated in the second damping plate 18, a pair of the screws 54 are optionally provided in threaded holes 56 on each side of the flexure 28 for rotating the movable portion 36 relative to the proof mass 12. Advancing one of the screws 54 while retracting the other screw 54 rotates the movable portion 36 toward or away from the proof mass 12, even when the flexure 28 is not structured to return the movable portion 36 to its original arrangement relative to the stationary portion 38. Furthermore, after a first of the screws 54 is advanced sufficiently to move the movable portion 36 to the second new altered damping gap height h2', the other screw 54 is optionally advanced across the corresponding groove 30 to apply sufficient pressure to rigidly fix the movable portion 36 at the altered damping gap height h2'. The pair of screws 54 in threaded holes 56 thus provides still another method for rigidly fixing the altered damping gap heights h1' and h2' of the respective gaps 20, 22, which is yet adjustable by using the screws 54 to alter the width of the grooves 30 by varying the pressure applied to the movable portion 36.

While the preferred embodiment of the invention has been illustrated and described, it will be appreciated that various changes can be made therein without departing from the spirit and scope of the invention.

What is claimed is:

1. A force sensing mechanism, comprising:
   a first damping plate having a stationary portion, a moveable portion, and a flexure operable to flexibly couple the stationary portion to the moveable portion:
   a second damping plate having a stationary portion;
   a proof mass suspended for out-of-plane motion between the moveable portion of the first damping plate and the second damping plate;
   a proof mass flexure having a first end coupled to the proof mass, and having a second end coupled to the stationary portion of the first damping plate and to the stationary portion of second damping plate; and
   a control structure coupled to the first damping plate and operable to move the moveable portion of the first damping plate from a first position to a second position relative to the proof mass.

2. The mechanism of claim 1 wherein the control structure is coupled to the flexure between the movable and stationary portions of the first damping plate.

3. The mechanism of claim 1 wherein the flexure between the movable and stationary portions of the first damping plate is positioned substantially midline of the damping plate.

4. The mechanism of claim 1 wherein the flexure between the movable and stationary portions of the first damping plate is spaced away from a midline of the damping plate.

5. The mechanism of claim 1 wherein the flexure comprises:
   a flexure portion coupling the stationary portion and the moveable portion; and
   a groove separating the stationary portion and the moveable portion.

6. The mechanism of claim 1 wherein the flexure comprises:
   a flexure portion coupling the stationary portion and the moveable portion; and
   a plurality of grooves separating the stationary portion and the moveable portion.

7. The mechanism of claim 1, wherein the second damping plate has a stationary portion, a moveable portion, and a flexure operable to flexibly couple the stationary portion to the moveable portion, and further comprising:
   a second control structure coupled to the second damping plate and operable to move the moveable portion of the second damping plate from a third position to a fourth position relative to the proof mass.

8. The mechanism of claim 1 wherein the control structure is coupled between the movable and stationary portions of the first damping plate.

9. The mechanism of claim 8 wherein the control structure further comprises a substantially rigid threaded structure that is adjustably coupled between the movable and stationary portions of the first damping plate.

10. The mechanism of claim 8 wherein the control structure further comprises a substantially rigid material that is fixedly coupled between the movable and stationary portions of the first damping plate.

11. The mechanism of claim 10 wherein the substantially rigid material of the control structure further comprises a portion of a piezoelectric material.

12. A force sensing mechanism, comprising:
   a proof mass suspended for out-of-plane motion between first and second spaced damping plates;
   first and second gas damping gaps formed between the proof mass and the respective first and second damping plates;
   the first damping plate having a stationary portion that is stationary relative to the proof mass and a moveable portion that is suspended from the stationary portion by one or more flexures formed therebetween, the movable portion being movable to an altered position relative to the proof mass; and
   a position control structure coupled to control the movable portion of the first damping plate relative to the altered position.

13. The mechanism of claim 12 wherein the movable portion of the first damping plate is suspended from the stationary portion of the first damping plate by a flexure.

14. The mechanism of claim 13 wherein the flexure between the movable and stationary portions of the first damping plate is positioned substantially midline of the damping plate.

15. The mechanism of claim 13 wherein the flexure between the movable and stationary portions of the first damping plate is spaced away from a midline of the damping plate.

16. The mechanism of claim 13 wherein the position control structure further comprises adjustment structure for varying the altered position of the movable portion of the first damping plate relative to the proof mass.

17. The mechanism of claim 16 wherein the adjustment structure further comprises an electrical adjustment structure.

18. The mechanism of claim 16 wherein the adjustment structure further comprises a mechanical adjustment structure.

19. An accelerometer mechanism, comprising:
   a proof mass suspended for out-of-plane motion between first and second spaced apart damping plates;
   first and second gas damping gaps formed between the proof mass and the respective first and second damping plates, the first damping gap being adjustable;
   the first damping plate having a stationary portion that is stationary relative to the proof mass and a movable portion that is suspended from the stationary portion by one or more flexures formed therebetween, the movable portion being movable from a first position relative to the proof mass to a range of altered relative positions for adjusting the first damping gap; and
   position control structure coupled to drive the movable portion of the first damping plate from the first position relative to the proof mass within the range of altered relative positions, and retain the movable portion of the first damping plate in one of the altered positions within the range of altered positions.

20. The mechanism of claim 19 wherein the position control structure further comprises one of a fixed and a variable position control structure.

21. The mechanism of claim 20 wherein the variable position control structure further comprises a control structure that is variable as a function of an applied electrical signal.

22. The mechanism of claim 20 wherein the variable position control structure further comprises a control structure that is variable as a function of an applied mechanical stress.

* * * * *

UNITED STATES PATENT AND TRADEMARK OFFICE
CERTIFICATE OF CORRECTION

PATENT NO. : 7,392,685 B2 Page 1 of 1
APPLICATION NO. : 11/190371
DATED : July 1, 2008
INVENTOR(S) : Stephen F. Becka It is certified that error appears in the above-identified patent and that said Letters Patent is hereby corrected as shown below:

In column 8, line 28 the end of the sentence should be changed from ":" to --;--

Signed and Sealed this

Twenty-third Day of September, 2008

JON W. DUDAS
*Director of the United States Patent and Trademark Office*